United States Patent
Thornburg

[11] Patent Number: 5,685,134
[45] Date of Patent: Nov. 11, 1997

[54] SIMULTANEOUS LITTER REMOVAL AND GRASS CUTTING APPARATUS

[75] Inventor: Cecil Jackson Thornburg, Ashland, Ala.

[73] Assignee: The Burg Corporation, Sylacauga, Ala.

[21] Appl. No.: 577,080

[22] Filed: Dec. 22, 1995

[51] Int. Cl.⁶ .................................................. A01D 43/00
[52] U.S. Cl. .......................... 56/12.9; 56/16.6; 56/16.9; 56/202; 56/DIG. 8
[58] Field of Search ........................... 56/12.8, 12.9, 56/13.1, 13.2, 14.7, 16.6, 16.9, 202, 320.1, 320.2, DIG. 8, DIG. 9

[56] References Cited

U.S. PATENT DOCUMENTS

| | | | |
|---|---|---|---|
| 3,006,128 | 10/1961 | Weiland | 56/16.6 X |
| 3,203,022 | 8/1965 | Clarke | 15/347 |
| 3,406,424 | 10/1968 | Rush | 15/347 X |
| 3,562,845 | 2/1971 | Hayden | 15/347 |
| 3,624,989 | 12/1971 | Gatheridge | 56/79 |
| 3,744,653 | 7/1973 | Jensen | 214/502 |
| 3,903,565 | 9/1975 | Hicks | 15/352 |
| 4,043,100 | 8/1977 | Aumann et al. | 56/13.1 X |
| 4,741,148 | 5/1988 | Ekas, Sr. et al. | 56/13.4 X |
| 4,881,362 | 11/1989 | Parker et al. | 56/202 |
| 4,993,107 | 2/1991 | Zoni | 15/352 |
| 5,010,620 | 4/1991 | Young | 15/347 |
| 5,058,235 | 10/1991 | Charky | 15/340.1 |
| 5,218,737 | 6/1993 | Dansby, et al. | 15/347 |
| 5,435,118 | 7/1995 | Cobile | 56/16.9 X |
| 5,542,243 | 8/1996 | Yuki et al. | 56/DIG. 8 |

OTHER PUBLICATIONS

"Vac-N-Bag" Information Brochure (attached) date unknown.

*Primary Examiner*—Terry Lee Melius
*Assistant Examiner*—Heather Shackelford
*Attorney, Agent, or Firm*—Veal & Associates

[57] ABSTRACT

An apparatus towed behind a conventional farm tractor has a vacuum section ahead of a conventional mowing section so that litter and other debris are vacuumed into a rear hopper before entering into the mowing section. A conventional power take-off unit on the tractor distributes power via a transmission unit to a pair of centrifugal fans for the vacuuming stage and power to three mower blades. The apparatus may optionally have a sorting section in the discharge tube from the centrifugal fans to separate heavier recyclable debris from lighter debris such as grass clippings.

24 Claims, 6 Drawing Sheets

SIMULTANEOUS LITTER REMOVAL AND GRASS CUTTING APPARATUS

FIELD OF THE INVENTION

This present invention relates to mowing and vacuuming apparatus. In particular this invention relates to machines that vacuum and bag litter while simultaneously cutting grass or other vegetation. In more particularity, the present apparatus relates to machines that have a vacuum section ahead of the mower section such that debris or litter may be vacuumed into a hopper before entering the mower section. In even greater particularity, the present invention relates to apparatuses that can vacuum litter and debris before mowing grass or other vegetation and also sort the vacuumed litter into different bins to facilitate recycling.

BACKGROUND OF THE INVENTION

Litter control on our highways is major problem. With over 7 million linear miles of highway right of way, our highways have the potential to become the largest garbage dumb in the world. Similarly, maintenance of our highways right of way and municipal parks, requires an enormous fleet of tractors to cut grass and weeds. Other industries such as golf courses, municipal fields, government installations, and race tracks, also have enormous costs to cut grass and clean-up litter. Hand pickup of recyclable trash is time consuming and unfeasible on such large scales. Nevertheless, an enormous positive environmental impact would be felt if an efficient way to collect recyclable litter could be combined with the present established fleet of maintenance vehicles and lawn mowing attachments.

The reduction of loose debris on our highways is also a problem. Traditional tractor mowers towed behind tractors disperse potentially recyclable litter by mulching bottles, cans, and paper into small pieces. These small pieces are much more difficult for laborers to spot and retrieve and tend to build-up layers of litter. Furthermore, the small pieces of plastic and paper are much more likely to be blown by the wind onto our highways clogging intake ports of cars and trucks, and much more likely to be dispersed by rain runoff into streams and lakes thus increasing environmental pollution.

Various prior art exist to address the need for either mowing lawn and weeds, or for vacuuming debris from fields or other terrain. In the vacuum class, Clarke, U.S. Pat. No. 3,203,022, discloses a mobile suction machine or vacuum cleaner adapted to be transported and powered by a conventional tractor. A conventional power take-off mechanism attached to a drive pulley powers a centrifugal fan that draws up debris from a vacuum nozzle. An exhaust manifold directs the debris into a hopper for collection.

Hayden, U.S. Pat. No. 3,562,845, discloses an apparatus for removing litter from relatively compact surfaces. The apparatus includes a wheel-equipped frame with an accumulating casing and channel structure for admitting litter beneath the apparatus. A front-mounted, rear-facing fan blows the admitted litter or debris into and over the underlying channel structure and into a screened receptacle. The apparatus has the capability of self-propulsion and the placement of an auxiliary blower on one side of the frame to blow litter on the curb into the accumulating casing.

Rush, U.S. Pat. No. 3,406,424, discloses a lawn and parking lot cleaner having a propelling or driving vehicle and a cleaning vehicle, which latter includes beating and suction equipment in the form of a large fan collecting debris from a bladed beater near the ground surface. The driving vehicle and the cleaning vehicle are joined together by a universal joint which permits the suction and beating vehicle to move independently in the vertical and transverse directions or "float" with respect to the driving vehicle.

Jensen, U.S. Pat. No. 3,744,653, discloses a mobile lift-dump type vacuum apparatus which includes a vacuum system on a wheeled frame to pick-up debris. A hopper is movable from a load position in which it receives debris, to a dump position in which the debris are dumped. The hopper includes articulated arms and linkages for dumping debris into elevated trash bins and the like.

Zoni, U.S. Pat. No. 4,993,107, discloses a filtering and collecting vacuum device of solid and powder refuse. The device includes a manifold connecting a suction duct to filters and storage bags to separate light weight debris from heavy debris. A foraminous partition septa is provided within the manifold to separate the dust from light weight particles.

Young, U.S. Pat. No. 5,010,620, discloses a stall and pasture vacuum machine with a trailer frame supported by an axle and wheels containing a receptacle. A fine mist from a water tank can be applied to the dust and manure sucked-up by the centrifugal blower before depositing the debris into the receptacle. A standard tractor P.T.O. drives the centrifugal blower and mister.

Charky, U.S. Pat. No. 5,058,235, discloses a mobile vacuum trash collector having a motorized cart, a trash bin mounted on the cart, a flexible hose connected to the lid of the bin, and a vacuum blower comprised of a pair of rotating fans positioned at the bottom end of the trash bin opposite the bin lid. The blower pulls air into the flexible hose and out the bottom of the trash bin so that debris are compacted at the bottom of the bin.

Dansby, U.S. Pat. No. 5,218,737, discloses a detachable hopper and vacuum apparatus, which includes a detachable hopper having a slidably mounted tongue for optionally attaching to a conventional towing vehicle or recessing to facilitate coupling to the vacuum apparatus of this invention by means of a bayonet-type coupling mechanism.

Besides the conventional mower, some improvements on the hopper apparatus also exist. Gatherridge, U.S. Pat. No. 3,624,989, discloses a castered attachment used by rotary lawn mowers for carrying the collection container for clippings, leaves, etc., between the handle bars of the mower. The attachment is pivotally coupled to the mower so that the attachment and container does not interfere with the maneuverability of the mower.

Similarly, Hicks, U.S. Pat. No. 3,903,565, discloses a leaf and grass cart bagger adapted for operative connection with a mower, tractor, or other vehicle equipped with a pickup and blower motor, or with a power or manually propelled lawn vacuum and the like. The bagger includes a can having a perforated container into which debris are deposited via the blower. The container is pivotally mounted on the cart for tilting and discharge.

While these inventions address individually vacuuming, the separation of dust or loose debris from heavier debris after vacuuming, the collection of grass cuttings into various receptacles, and various means for unloading the collected debris, none of these inventions or others in the known prior art address the need for a combined conventional grass mowing apparatus with a vacuuming device so that litter and grass cuttings may be vacuumed and placed into a receptacle before entering the cutting blade area. Furthermore, none of the inventions disclose a combined vacuum and mowing apparatus capable of sorting the vacuumed debris to facilitate recycling.

SUMMARY OF THE INVENTION

It is the object of the present invention to provide an apparatus that can utilize a conventional power take-off unit from a vehicle to vacuum debris and simultaneously mow grass and weeds.

It another object of the present invention to provide an apparatus that can vacuum debris from a field or lawn and separate recyclable debris from discardable debris.

Still another object of the present invention is to provide an apparatus that can be towed behind a conventional farm tractor or similar vehicle to vacuum-up litter and grass clippings from grass and weeds prior to cutting the grass and weeds, and sort the recyclable litter from the discardable litter by placing each in bags in separate hopper bins.

The apparatus may be briefly described as a conventional mower towed by a conventional farm tractor or similar vehicle and powered by a conventional power take-off unit (PTO). A partition separates the underside of the apparatus's frame into a mower section having multiple rotating blades and a forward vacuum section. Two large nozzles are placed in the top of the forward vacuum section through the frame housing and are attached to two PVC inlet pipes or tubes which are in turn connected to two centrifugal fans positioned on top of the frame. A transmission unit in the middle of the apparatus distributes power from an input shaft from the PTO to the mower and the centrifugal fans therefore providing power for the mower blades to cut the grass and the fans to produce vacuum in the inlet tube. As the apparatus is towed across the ground, the fans draw debris into the inlet pipes for discharge into a bag contained within a rear hopper. The mower blades simultaneously cut the grass or weeds free of litter or other loose debris which have already been removed. If sorting of the vacuumed debris is desired, the discharge tube coming out of the centrifugal fan can be fitted with a pipe section having a series of small holes and vents. As litter moves up and out of the discharge port of the fan and up the discharge tube, air escapes from the holes and vents so that the velocity of the heavier items is decreased. Heavier objects, such as cans and bottles, fall into a first tubular port extending down from the discharge tube, and lighter debris, such as grass cuttings, leaves, and paper, are carried beyond the first tubular port and into a second port. Collection bags or wire bins are attached to each port in a hopper for collection. To facilitate removal of the recyclable debris and non-recyclable debris, the hopper is attached to the frame of the apparatus so that it may be accessed to facilitate removal of the bags.

Other features and objects and advantages of the present invention will become apparent from a reading of the following description as well as a study of the appended drawings.

BRIEF DESCRIPTION OF THE DRAWINGS

Apparatus embodying features of my invention are illustrated in the enclosed drawings which form a portion of this disclosure and wherein.

DESCRIPTION OF THE PREFERRED EMBODIMENTS

Figure 1:
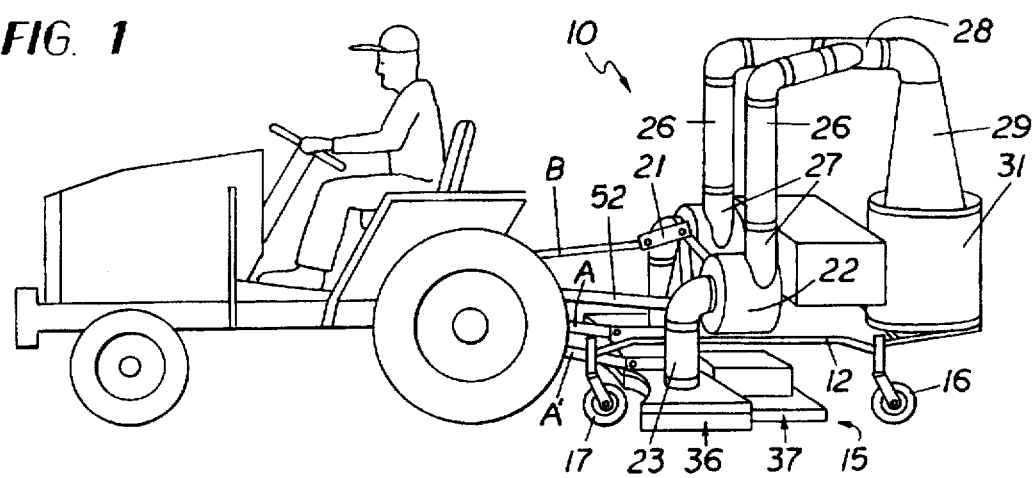
FIG. 1 is a perspective view of the apparatus being towed by a conventional tractor.

Referring to the drawings for a better understanding, FIG. 1 shows the apparatus being towed behind a conventional tractor. The apparatus can be towed over variable terrain as with a conventional mower. The apparatus is powered by the PTO from the tractor in a conventional fashion.

Figure 2:
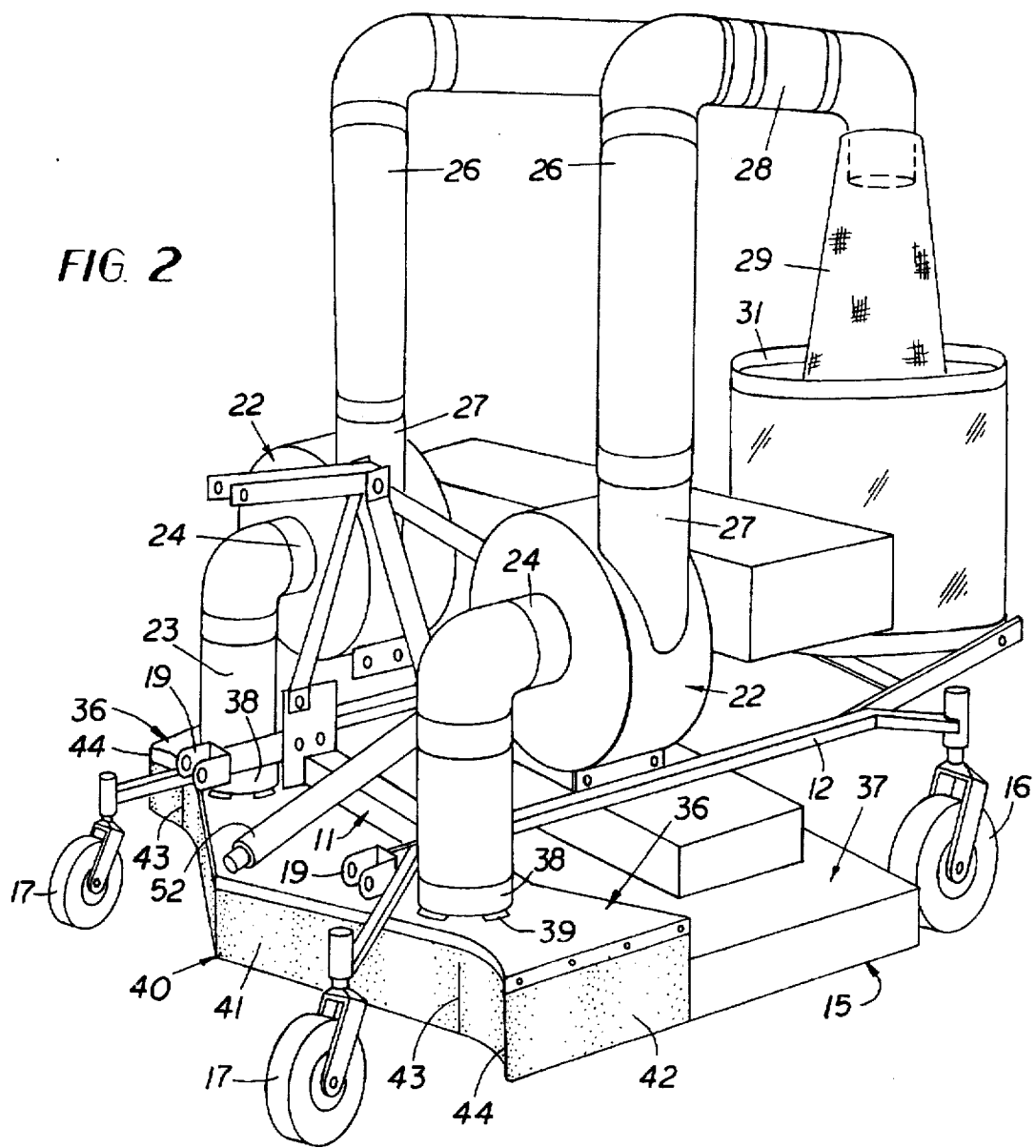
FIG. 2 is a front perspective view of the apparatus detached from the towing tractor.
Figure 5:
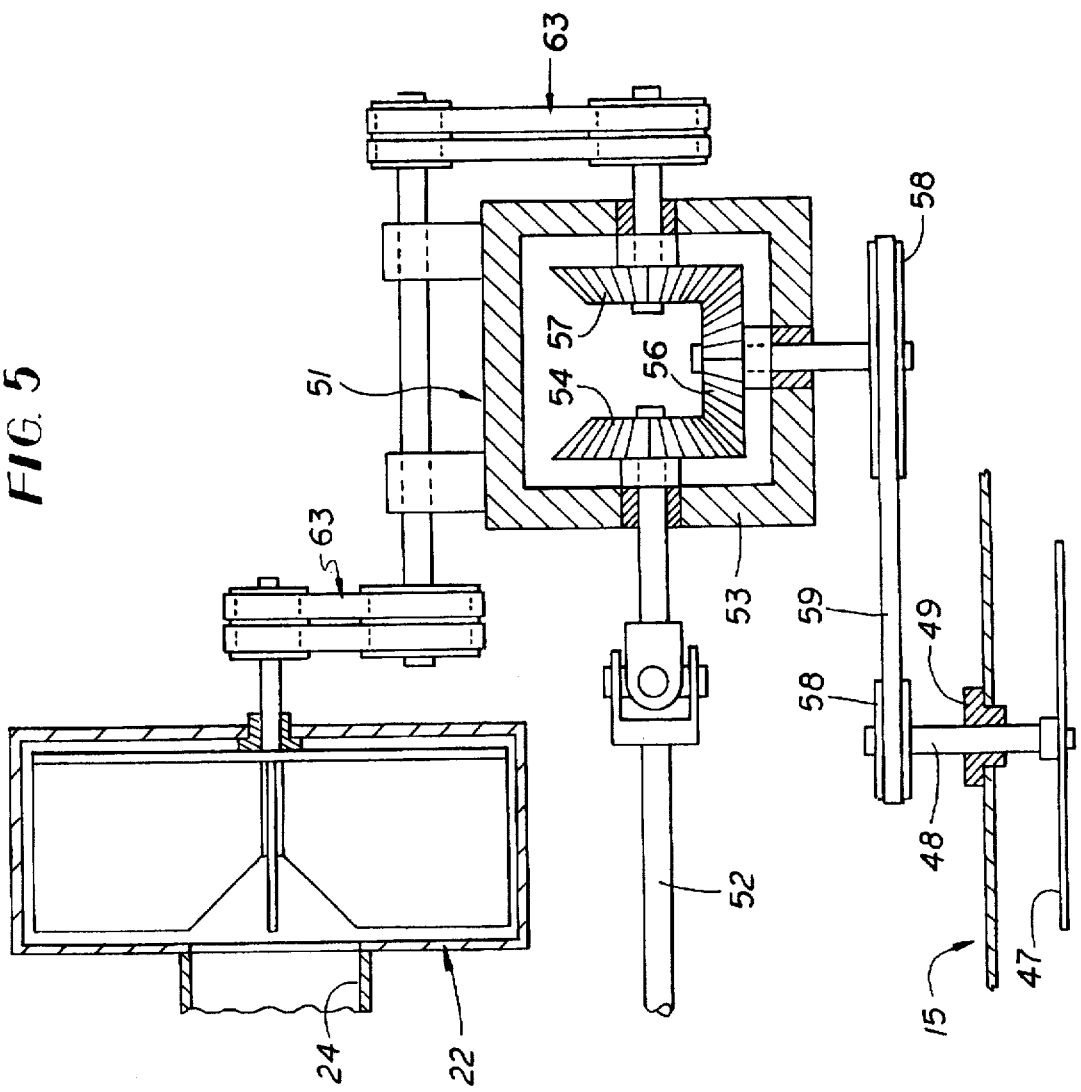
FIG. 5 is an enlarged section view of the transmission unit.

FIG. 2 shows the overall unit 10 in a non-sorting, vacuum and mowing only embodiment. The apparatus has a main frame 11 with a pair of rigid longitudinal support beams 12 connected to and extending beyond the front 13 and back 14 of a housing 15. The support beams and thereby the housing 15 are supported by a pair of wheels 16 extending from the rear of the apparatus attached to the support beams 12 and, as shown in FIG. 1, another pair of wheels 17 attached to the front extension of the support beams 12. FIG. 5 shows an embodiment in which the front of the apparatus 10'is supported in part by a conventional three point linkage 18 rather than the pair of wheels 17. As is well known in the art, the linkage consists of three control rods, two lower control rods A, A'and an upper larger control rod B. The two lower rods are pivotally attached to two elongated brackets 19 fixed to the frame 11, and the upper control rod is pivotally attached to a bracket 21 at a center point. The upper control rod B may be retracted to control the height of the apparatus in a conventional fashion.

Referring to FIG. 2, two centrifugal fans 22 sit on top of the housing 15 each supported by the longitudinal beams 12. Each fan has a inlet pipe 23 or tube attached to a center inlet port 24, and a discharge pipe 26 or tube attached to a tangential outlet port 27. In the embodiment of FIG. 2, the discharge pipes merge into a single discharge pipe 28 which then empties into a debris bag 29 contained within a rear hopper 31. The debris bag 29 is porous so that air can escape but dust and debris is retained.

Figure 3:
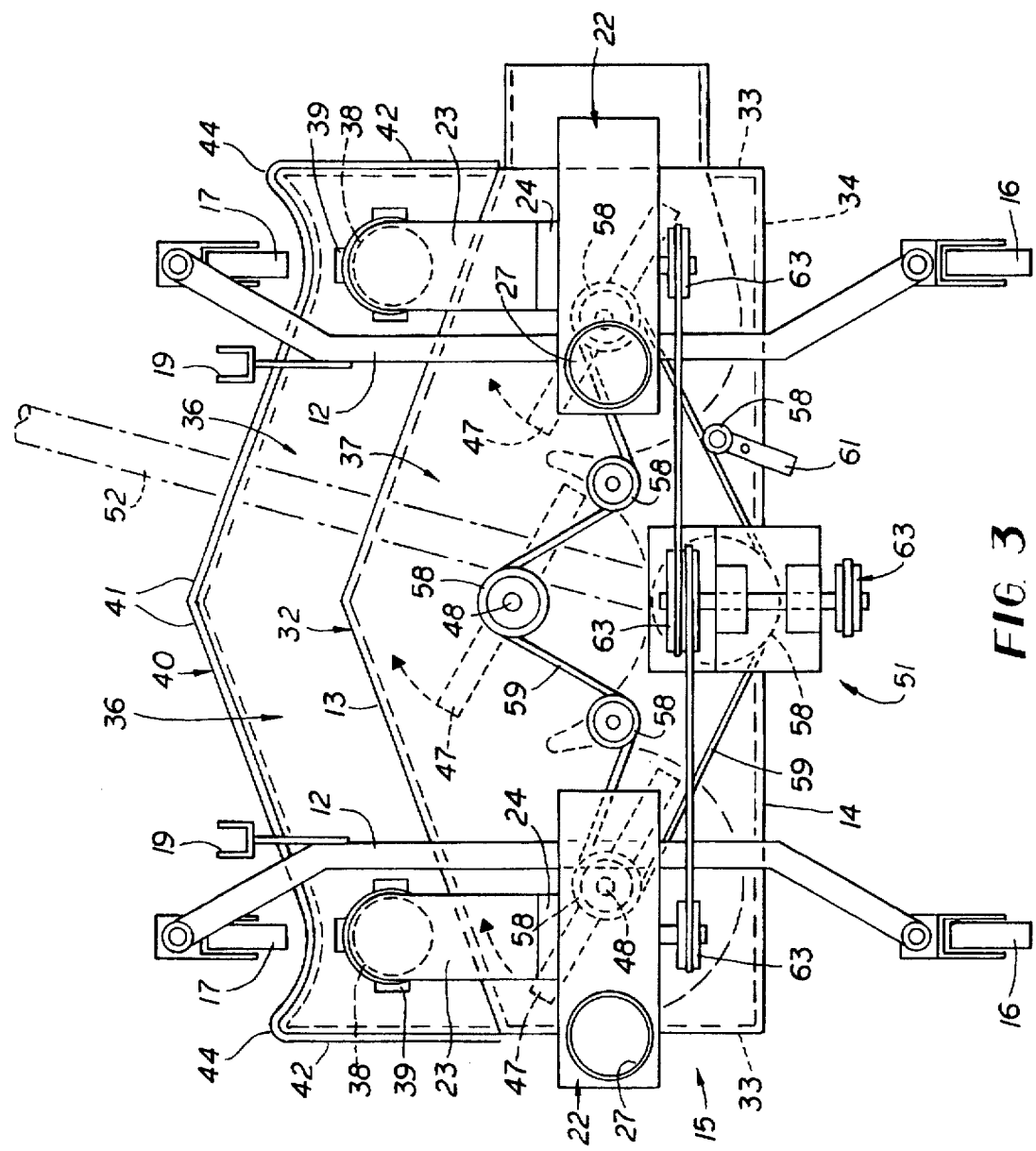
FIG. 3 is a top plan view of the apparatus.
Figure 4:
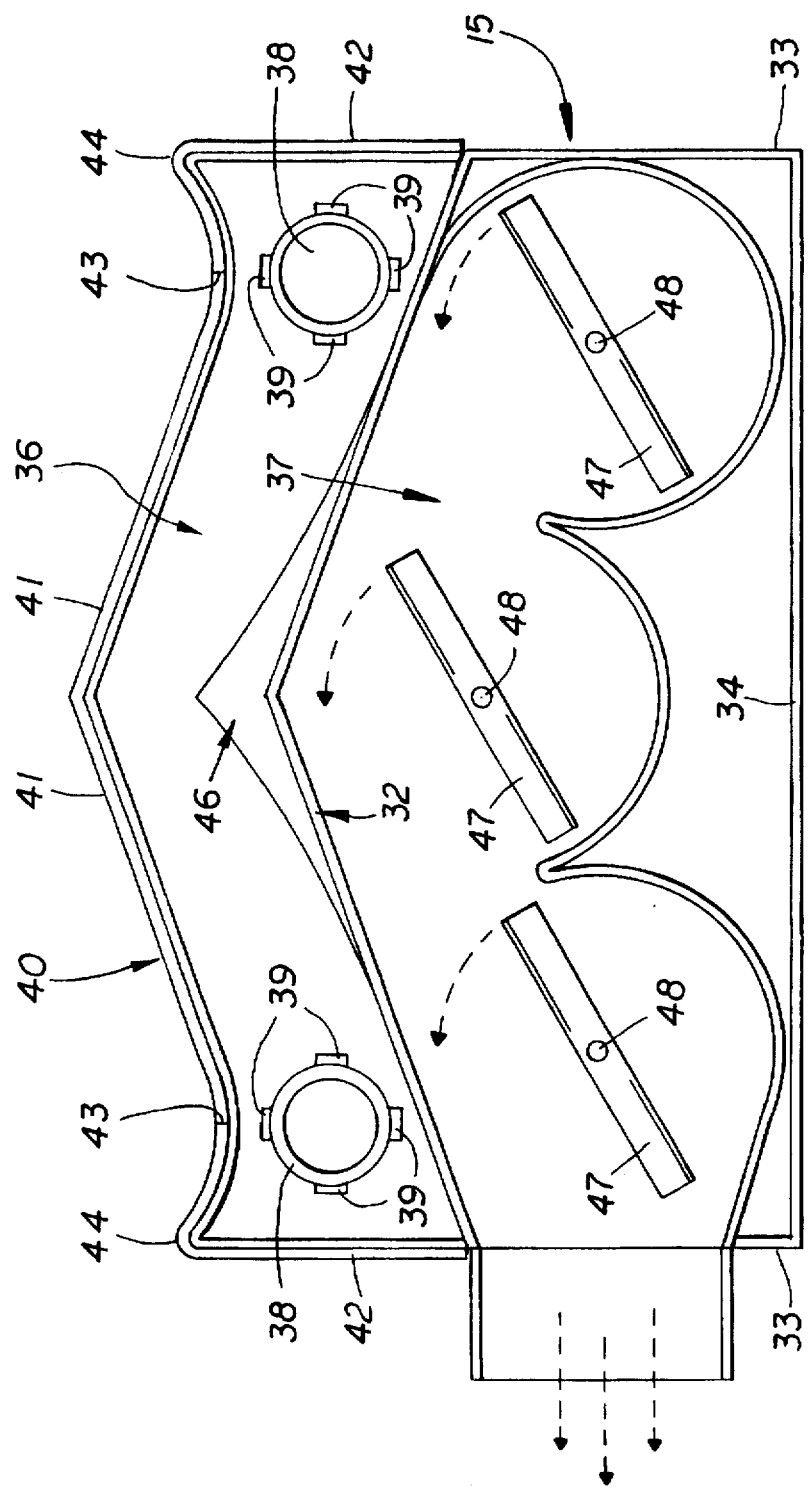
FIG. 4 is a bottom view of the apparatus.

FIGS. 3 and 4 show the partitioning of the underside of the housing 15. A transverse partition 32 has a slightly "V" shape and is forward pointing. The partition 32 in conjunction with the housing's downward extending side walls 33 and back wall 34 forms two sections 36 and 37. Forward vacuum section 36 is connected to inlet pipes 23 through separate vacuum nozzles 38 positioned in the top of the housing 15 toward each side of the frame. Each nozzle 38 has a series of semi-annular orifices 39 formed thereabout at the point where the inlet tube connects to the housing. These are drainage orifices which prevent ice build-up within the nozzle in wet freezing conditions.

A resilient outer skirt molding 40 is affixed on the vacuum section 36 of the housing 15 and forms resilient vertical front 41 and side 42 walls downward to near ground level and forms a slightly forward facing "V" shape cooperatively with the partition and in conformity with the housing 11. A small slit 43 in the molding 40 in front of each vacuum nozzle 38 facilitates entry of debris into the vacuum section 36 via the resilient molding 40. In addition to the slits, the outer molding 40 is shaped with forwardly extending protrusions 44 on each side to direct debris toward the slits and to confine the debris to an area adjacent the vacuum nozzles. Although not critical to the operation of the apparatus, an inner molding 46 may be attached to the V-shaped partition 32 to direct debris into the vacuum nozzle and enhance the vacuum effect from within the vacuum section. Rearward of the transverse partition a mower section 37 contains three rotating cutting blades 47 on vertical spindles 48 supported by bearings 49 in the frame. Cuttings exit from a side vent, and although not shown a tube or duct may be attached to the side vent as is well known in the art to direct the cuttings into the hopper.

Referring to FIG. 5 and again to FIG. 3, power is provided to the unit from a transmission unit 51 mounted in the center of the housing 15 which distributes power to the fans 22 and the mowing spindles 48. Drive shaft 52 is coupled to the PTO of the tractor which tows the apparatus. Drive shaft 52 is a conventional articulated drive shaft having appropriate U joints to transfer power to the transmission unit 51. Transmission unit 51 includes a housing 53 which also serves as a support for transmission components including an input coupling gear 54, which may be a beveled pinion gear, a transfer gear 56, and at least one fan drive gear 57. It should be understood that the transmission unit may have many forms, however, the sole power to the apparatus is transmitted from the PTO to the operating components through the transmission unit 51. In the illustrated embodiments, transfer gear 56 is mounted for rotation about a vertical axis and drives an output axle which in turn drives a set of drive and idler pulleys 58 via a single belt 59 which is appropriately threaded over the pulleys 58. The drive pulleys are operatively affixed to the spindles 48 to drive the blades 47. One of the idler pulleys is mounted such that it may be translated to tension belt 59 in an engaged mode or slacken belt 59 in a disengaged mode such that the blades can be selectively driven. The pulley is positioned by a manually operated lever 61 or by any conventional positioning means. It is to be understood that the belt 59 may be replaced with a chain and the pulley's may be replaced by sprockets, it being the intent of the disclosure that the mowing blades be operably connected to the same source of power as the vacuum means and selectively engagable.

Fan drive gear 57 may be connected to the fans by a belt and pulley arrangement 63. The mechanical advantage and gear ratio's of the connections of the PTO to both the fans 22 and the mowing blades 47 must be appropriate to obtain effective cutting an vacuuming at the same time. With that in mind, it should be understood that the drive 63 may also be a chain linkage or other mechanical linkage.

Figure 6:
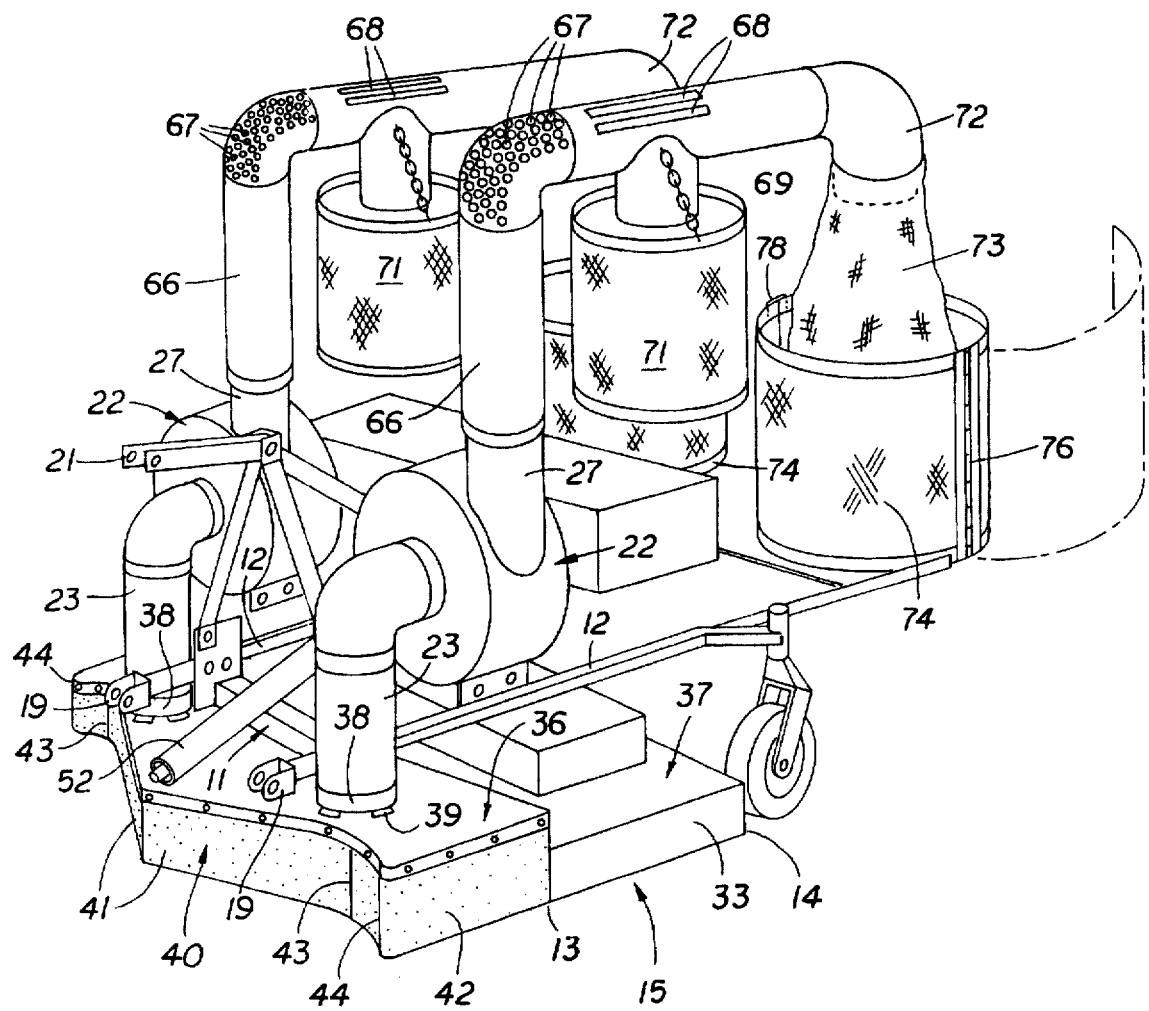
FIG. 6 is a perspective view of a second embodiment of the apparatus with a sorting discharge pipe installed.
Figure 7:
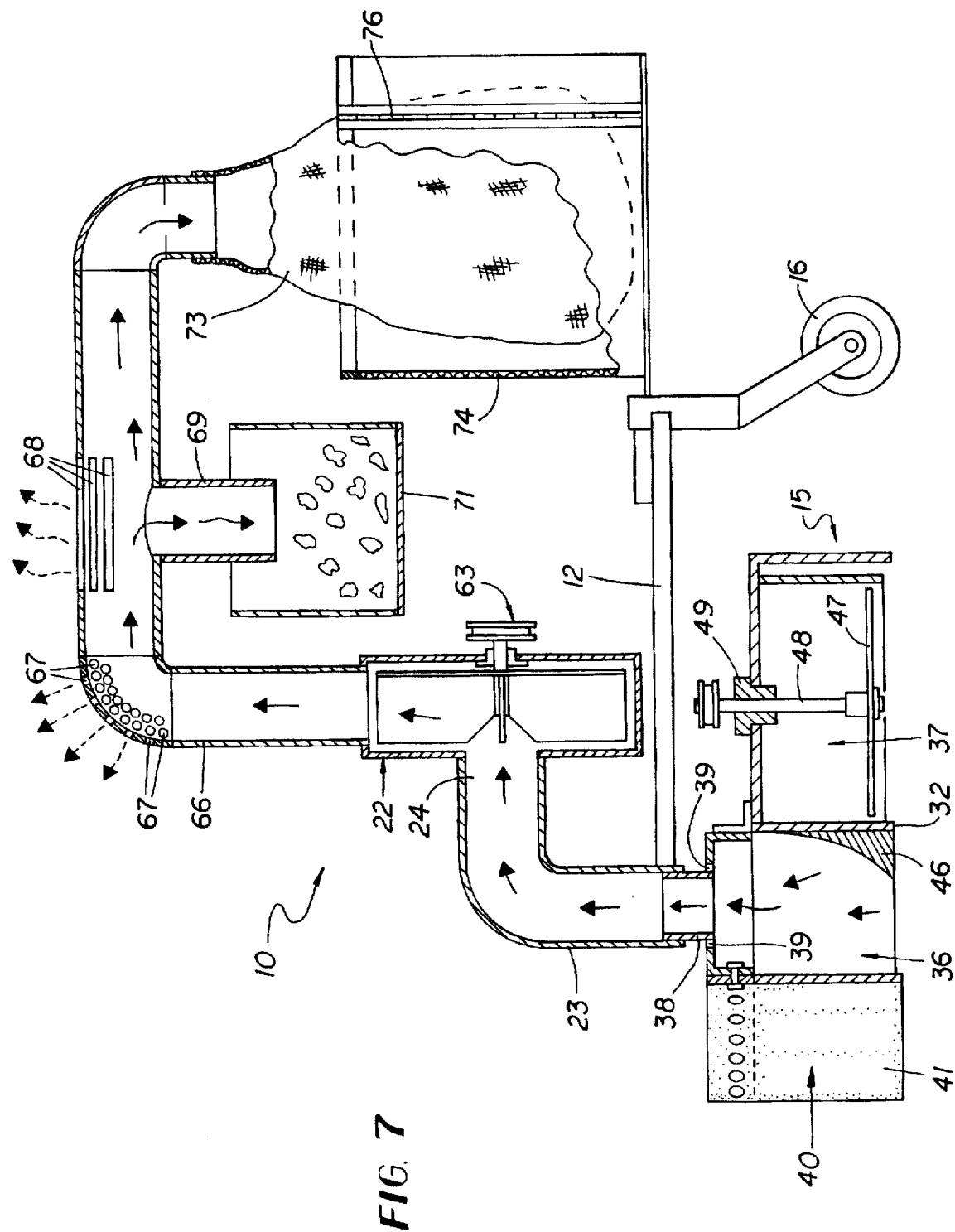
FIG. 7 is a side elevation view in section showing the flow of debris in the sorting embodiment.

FIGS. 6 and 7 show the preferred embodiment of the apparatus. Discharge tubes 66 rise upward from the centrifugal fans 22 and turn horizontally toward the rear of the apparatus 11. A group of apertures 67 are found located at the initial turn in the tube 66, and a series of longitudinal vents 68 is located adjacent the group of holes. Each discharge tube 66 has a tubular port 69 extending downwardly from a lower surface of the discharge tube below the series of vents 68. Each tubular port opens into a bin 71 for the recovered recyclable debris. Although wire bins are shown, bags may be used and both may be supported by the frame of the apparatus or simply hung from the discharge tube 66. Rearwardly of the tubular port 69, the discharge tube 66 terminates in a second port 72 which communicates with debris bag 73 surrounding the port 72. The bag is connected with elastic or other resilient means as shown and catches any debris not dropped through port 69. The bags 73 are contained within two larger rear hoppers 74. Each hopper 74 has a vertical piano hinge 76 connecting a clam shell door portion which is secured by a latch 78 and operable to remove a debris bag 73.

In typical operation, the apparatus is towed behind a tractor over a grassy area where litter is present. As the apparatus travels across the field, the forward molding skirt flexes to allow litter under the molding. Also, due to the shape of the outer molding protrusions, the litter will tend to be pushed toward the slits in the molding of each side. As litter enters the vacuum section, the vacuum nozzles draw up litter into the inlet pipes. The centrifugal fans are sufficiently powered such that litter will be deformed and pushed by the fan blades under pressure into the discharge ports and discharge tube. The debris traveling through the discharge tube will encounter a decrease in air velocity at the initial bend due to the reduction in pressure within the discharge tube from the holes and vents. Heavier debris such as cans and pieces of plastic will fall out of the air stream and into the discharge port below the vents. The heavier litter will, therefore, collect in the bin attached to the discharge port. Lighter litter such as grass clippings, paper, and light plastic, will continue in the reduced velocity air-stream into a rearward end of the discharge port and into a bag attached to the pipe end. Light debris will, therefore, collect in a bag contained within the rear hoppers. The bags are made of a material such that any remaining air pressure entering the bags will diffuse through the bag lining. Simultaneously with the vacuuming of the debris, the mowing section will cut the grass and weeds unobstructed by litter and vent grass clippings out of the mowing vent. As is apparent from the structure of the mowing vent on the right side of the apparatus, a clockwise cutting procedure around a field perimeter will vent the initial grass cuttings toward the center of the field. The next pass over adjacent cutting width will vacuum the previously cut grass clippings into the hopper thereby removing clippings from the field. Conversely, a counter-clockwise cutting procedure will result in the grass clippings being left on the field for mulch purposes. In either strategy, the litter will be removed from the field ahead of the cutting operation.

While I have shown my invention in one form, it will be obvious to those skilled in the an that it is not so limited but is susceptible of various changes and modifications without departing from the spirit thereof.

Having set forth the nature of the present invention, what is claimed is:

1. An apparatus having a translatable ground support housing adapted to be connected to a towing vehicle having a power take-off unit, comprising:

a) a transmission unit carried by said housing and operatively connected in driving relation to said power take-off unit;

b) linkage means for connecting said housing to said towing vehicle;

c) said housing including a partition on an underside thereof forming a forward section and a rearward section, rotary cutting means within said rearward section to said transmission unit;

d) vacuum means supported by said housing and operatively connected to said transmission unit, said vacuum means having an inlet means within said forward section and a tangentially oriented outlet means;

e) hopper means attached to said housing for receiving debris from said outlet means; and.

f) wherein said forward section includes molding means for directing debris into said inlet means upon forward translation of said housing and in conjunction with said vacuum means, said molding means comprising a resilient outer skirt molding positioned on a leading edge of said forward section and extending downward to near ground level, said outer molding having a pair of vertical slits located proximal said inlet means to facilitate passage of larger sized debris under said outer molding, said outer molding being substantially "V" shaped and including a pair of forwardly extending resilient protrusions positioned on outer sides of said "V" for directing debris inwardly toward said slits, and wherein said molding means further comprises a resilient inner skirt molding positioned on a leading edge of said housing partition, said inner molding being substantially plow shaped and including a leading edge for directing said debris toward said inlet means.

2. An apparatus as recited in claim 1 wherein said rotary cutting means comprises at least one blade spindle vertically mounted in said housing, said spindle rotatably supporting a cutting blade, and wherein said spindle is operatively connected to said transmission unit.

3. An apparatus as recited in claim 1 wherein said transmission unit comprises, a first gear fixedly mounted to a drive shaft for concomitant rotation therewith and wherein said drive shaft is operatively connected to said power take-off unit, a second cooperating gear rotatably mounted within said transmission unit and operatively meshed with said first gear, an output gear rotatably mounted within said transmission unit and operatively meshed with said second gear, said second gear operatively engaged with and connected to said cutting means for rotation of same, and said output gear operatively engaged with and connected to said vacuum means.

4. An apparatus as recited in claim 3 wherein said vacuum means comprises at least one centrifugal fan, said fan having an inlet port, an outlet port, and a fan drive shaft, said inlet port connected to said inlet means, and said outlet port connected to said output means, said centrifugal fan creating an air vacuum at said inlet port upon operation of same.

5. An apparatus as recited in claim 4 wherein said inlet means comprises at least one suction nozzle located within said forward section and a tube connecting said nozzle to said inlet port.

6. An apparatus as recited in claim 5 wherein said hopper means comprises at least one wire meshed receptacle bin containing a debris bag attached to said output means.

7. An apparatus as recited in claim 5 wherein said hopper means comprises at least one wire meshed receptacle bin containing a debris bag attached to said output means, and a hinge means connecting said bin to said housing for pivotal tipping of said bin to facilitate removal of said bag.

8. An apparatus as recited in claim 1 wherein said vacuum means comprises at least one centrifugal fan, said fan having an inlet port, an outlet port, and a fan drive shaft, said inlet port connected to said inlet means, and said outlet port connected to said output means, said centrifugal fan creating an air vacuum at said inlet port upon operation of same.

9. An apparatus as recited in claim 8 wherein said forward section includes molding for directing debris into said nozzle upon forward translation of said housing.

10. An apparatus as recited in claim 9 wherein said means includes a plurality of wheels for supporting said housing over terrain at a selected height.

11. An apparatus as recited in claim 1 said outlet means further including sorting means for sorting various types of debris prior to entering said hopper means.

12. An apparatus as recited in claim 11 wherein said transmission unit comprises, a first gear fixedly mounted to a drive shaft for concomitant rotation therewith and wherein said drive shaft is operatively connected to said power take-off unit, a second cooperating gear rotatably mounted within said transmission unit and operatively meshed with said first gear in substantially ninety-degree relation thereto, an output gear rotatably mounted within said transmission unit and operatively meshed with said second gear in substantially ninety-degree relation thereto, said second gear operatively engaged with and connected to said cutting means for rotation of same, and said output gear operatively engaged with and connected to said vacuum means.

13. An apparatus as recited in claim 11 wherein said vacuum means comprises at least one centrifugal fan, said fan having an inlet port, an outlet port, and a fan drive shaft, said inlet port connected to said inlet means, and said outlet port connected to said output means, said centrifugal fan creating an air vacuum at said inlet port upon operation of same.

14. An apparatus as recited in claim 11 wherein said inlet means comprises at least one suction nozzle located within said forward section and a tube connecting said nozzle to said inlet port.

15. An apparatus as recited in claim 11 wherein said sorting means comprises a tubular section having one end connected to said outlet means and a discharge end, said tubular section having an upper surface and a lower surface, a first port formed in lower surface proximate said outlet means and terminating in said hopper means, a second port formed in said lower surface proximate said discharge end and terminating in said hopper means, said upper surface having a plurality of openings between said first port and said outlet means such that heavier debris flows out said first port and lighter debris flows out of said second port.

16. An apparatus as recited in claim 11 wherein said hopper means comprises at least one wire meshed receptacle bin containing a debris bag attached to said output means, and a hinge means connecting said bin to said housing for pivotal tipping of said bin to facilitate removal of said bag.

17. An apparatus as recited in claim 1 wherein said sorting means comprises a tubular section having one end connected to said outlet means and a discharge end, said tubular section having an upper surface and a lower surface, a first port formed in said lower surface proximate said outlet means and terminating in said hopper means, a second formed in said lower surface proximate said discharge end and terminating in said hopper means, said upper surface having a plurality of openings between said first port and said output means such that heavier debris flows out said first port and lighter debris flows out of said second port.

18. An apparatus as recited in claim 17 wherein said vacuum means comprises at least one centrifugal fan, said fan having an inlet port, an outlet port, and a fan drive shaft, said inlet port connected to said inlet means, and said outlet port connected to said output means, said centrifugal fan creating an air vacuum at said inlet port upon operation of same.

19. An apparatus as recited in claim 18 wherein said inlet means comprises at least one suction nozzle located within said forward section and a tube connecting said nozzle to said inlet port.

20. An apparatus as recited in claim 17 wherein said forward section includes means for directing debris into said nozzle upon forward translation of said housing.

21. An apparatus having a translatable ground supported housing adapted to be connected to a towing vehicle having a power take-off unit, comprising:
   a) means for connecting said housing to said towing vehicle;
   b) said housing including a partition on an underside thereof forming a forward section and a rearward section, rotary cutting means within said rearward section supported by said housing, said cutting means including an adjustable discharge vent on a side thereof for venting vegetation clippings a predetermined distance from said apparatus;

c) vacuum means supported by said housing having an inlet means within said forward section and a tangentially oriented outlet means;

d) a transmission unit carried by said housing including a first gear fixedly mounted to a drive shaft for concomitant rotation therewith and wherein said drive shaft is operatively connected to said power take-off unit, a second cooperating gear rotatably mounted within said transmission unit and operatively meshed with said first gear, an output gear rotatably mounted within said transmission unit and operatively meshed with said second gear, said second gear operatively engaged with and connected to said cutting means for mowing vegetation, and said output gear operatively engaged with and connected to said vacuum means for generating vacuum within said inlet means;

e) hopper means attached to said housing for receiving debris from said outlet means; and f) wherein said forward section includes molding means for directing debris into said inlet means, said molding means comprising a resilient outer skirt molding positioned on a leading edge of said forward section and extending downward to near ground level, said outer molding having a pair of vertical slits located proximal said inlet means to facilitate passage of larger sized debris under said outer molding, said outer molding being substantially "V" shaped and including a pair of forwardly extending resilient promotions positioned on outer sides of said "V" for directing debris inwardly toward said slits.

22. An apparatus as recited in claim 21, wherein said molding means further includes a resilient inner skirt molding positioned on a leading edge of said housing partition, said inner molding being substantially plow shaped and including a leading edge for directing said debris toward said inlet means.

23. An apparatus having a translatable ground supported housing adapted to be connected to a towing vehicle having a power take-off unit, comprising:

a) a transmission unit, carded by said housing and operatively connected in driving relation to said power take-off unit;

b) linkage means for connecting said housing to said towing vehicle;

c) said housing including a partition on an underside thereof forming a forward section and a rearward section, rotary curing means within said rearward section supported by said housing and operatively connected to said transmission unit;

d) vacuum means supported by said housing and operatively connected to said transmission unit, said vacuum means having an inlet means within said forward section and a tangentially oriented outlet means;

e) said forward section including molding means on an exterior portion thereof for directing debris into said inlet means, said molding means comprising a resilient outer skirt molding positioned on a leading edge of said forward section and extending downward to near ground level, said outer molding having a pair of vertical slits located proximal said inlet means to facilitate passage of larger sized debris under said outer molding, said outer molding being substantially "V" shaped and including a pair of forwardly extending resilient protrusions positioned on outer sides of said "V" for directing debris inwardly toward said slits;

f) hopper means attached to said housing for receiving debris from said outlet means; and g) sorting means attached to said vacuum means comprising a tubular section having one end connected to said outlet means and a discharge end, said tubular section having an upper surface and a lower surface, a first port extending downward from said lower surface proximate said outlet means and terminating in said hopper means, a second port extending downward from said lower surface proximate said discharge end and terminating in said hopper means, said upper surface having a plurality of openings between said first port and said outlet means such that heavier debris flows out said first port and lighter debris flows out of said second port.

24. An apparatus as recited in claim 23, wherein said molding means further includes a resilient inner skirt molding positioned on a leading edge of said housing partition, said inner molding being substantially plow shaped and including a leading edge for directing said debris toward said inlet means.

* * * * *